(12) United States Patent
Grzesiak et al.

(10) Patent No.: US 8,336,219 B2
(45) Date of Patent: Dec. 25, 2012

(54) APPARATUS AND METHOD FOR CALIBRATING A SCANNING HEAD

(75) Inventors: Jean-Louis Grzesiak, Bristol (GB); James Arash Shabani, Bristol (GB)

(73) Assignee: Renishaw PLC, Wotton-Under-Edge (GB)

( * ) Notice: Subject to any disclaimer, the term of this patent is extended or adjusted under 35 U.S.C. 154(b) by 387 days.

(21) Appl. No.: 12/451,959

(22) PCT Filed: Jun. 18, 2008

(86) PCT No.: PCT/GB2008/002077
§ 371 (c)(1),
(2), (4) Date: Dec. 9, 2009

(87) PCT Pub. No.: WO2008/155541
PCT Pub. Date: Dec. 24, 2008

(65) Prior Publication Data
US 2010/0101104 A1 Apr. 29, 2010

(30) Foreign Application Priority Data
Jun. 21, 2007 (GB) .................................. 0712008.2

(51) Int. Cl.
*G01B 5/004* (2006.01)
(52) U.S. Cl. .......................................... 33/502; 33/503
(58) Field of Classification Search ............ 33/502–503, 33/1 M, 568–570, 573; 73/1.75, 866.5, 104
See application file for complete search history.

(56) References Cited

U.S. PATENT DOCUMENTS

| 4,888,877 A | 12/1989 | Enderle et al. |
| 5,084,981 A * | 2/1992 | McMurtry et al. ............... 33/556 |
| 5,138,563 A | 8/1992 | Debitsch et al. |
| 5,189,806 A * | 3/1993 | McMurtry et al. ............... 33/503 |

(Continued)

FOREIGN PATENT DOCUMENTS

EP 0 438 095 A1 7/1991

(Continued)

OTHER PUBLICATIONS

International Search Report mailed on Sep. 10, 2008 in corresponding International Application No. PCT/GB2008/002077.

(Continued)

*Primary Examiner* — Peter Macchiarolo
*Assistant Examiner* — Tania Courson
(74) *Attorney, Agent, or Firm* — Oliff & Berridge, PLC

(57) ABSTRACT

A method of calibrating a measurement scale in a motorized scanning head using a reference artefact is described. The method comprises the step of rotating a surface sensing device, such as a scanning probe, mounted on the scanning head about at least one axis of the scanning head to move the surface sensing device into a plurality of different angular orientations relative to the reference artefact. A step is then performed of measuring, with the surface sensing device, at least one property of the reference artefact at each of the different angular orientations. An error map or function is then created for at least one measurement scale of the scanning head using the properties of the reference artefact measured and optionally known or calibrated properties of that reference artefact. The method may comprise use of co-ordinate positioning apparatus, such as a co-ordinate measuring machine, to move the scanning head. The reference artefact may comprise a single feature or an array of features.

24 Claims, 8 Drawing Sheets

U.S. PATENT DOCUMENTS

| | | | | |
|---|---|---|---|---|
| 6,112,423 | A * | 9/2000 | Sheehan | 33/502 |
| 6,366,831 | B1 * | 4/2002 | Raab | 700/262 |
| 6,535,794 | B1 * | 3/2003 | Raab | 700/262 |
| 6,701,268 | B2 * | 3/2004 | Noda et al. | 702/95 |
| 6,772,619 | B2 * | 8/2004 | Nashiki et al. | 73/1.79 |
| 7,131,207 | B2 * | 11/2006 | McFarland | 33/503 |
| 7,543,393 | B2 * | 6/2009 | McMurtry et al. | 33/502 |
| 7,568,373 | B2 * | 8/2009 | McMurtry et al. | 73/1.81 |
| 7,885,777 | B2 * | 2/2011 | Jonas et al. | 702/95 |
| 8,001,859 | B2 * | 8/2011 | Mcmurtry et al. | 73/866.5 |
| 2003/0069709 | A1 | 4/2003 | Noda et al. | |

FOREIGN PATENT DOCUMENTS

| | | |
|---|---|---|
| WO | WO 90/07097 A1 | 6/1990 |
| WO | WO 2005/028996 A1 | 3/2005 |
| WO | WO 2006/114567 A1 | 11/2006 |

OTHER PUBLICATIONS

Written Opinion of the International Searching Authority mailed on Sep. 10, 2008 in corresponding International Application No. PCT/GB2008/002077.

* cited by examiner

APPARATUS AND METHOD FOR CALIBRATING A SCANNING HEAD

The present invention relates to an apparatus for and method of calibrating measurement scales. In particular, the present invention relates to apparatus for and a method of calibrating the measurement scales in a motorised scanning head.

It is known from International Patent Application No. WO90/07097 to mount a motorised scanning head on a coordinate positioning machine. The motorised scanning head enables a stylus mounted on the motorised scanning head to be rotated about two orthogonal axes. Thus the stylus may be positioned angularly about these two axes whilst the motorised scanning head can be positioned by the coordinate positioning machine in any position within the working volume of the machine.

Such a motorised scanning head provides a coordinate positioning machine with greater scanning flexibility because the motorised scanning head can position a probe or stylus mounted on it in many different orientations.

A motorised scanning head enables a probe, stylus or other device mounted on it to be rotated about one or more axes. The motorised scanning head is therefore provided with one or more transducers to measure the rotation about this one or more axis. The transducers are typically encoders, comprising a measurement scale and readhead. For accurate measurement the measurement scale is calibrated.

International patent application WO2006/114567 discloses a method of calibrating the encoders or measurement scale in a motorised scanning head. The motorised scanning head is directly coupled to a calibrated rotary stage. The scanning head is rotated about one of its rotational axes whilst the encoder readings in the scanning head are recorded simultaneously with the encoder readings in the rotary stage.

The position reading from the scanning head encoders and calibrated rotary stage position reading are then compared.

This method has the disadvantage that the motorised scanning head and the calibrated rotary stage must be accurately aligned.

International patent application WO2006/114567 also discloses a method of calibrating the encoders in a motorised scanning head using an angular interferometer. A refractive artefact is mounted on the scanning head in the light path of the angular interferometer. The scanning head is rotated about one of its rotational axes whilst measurements are taken with the scanning head encoders and the interferometer apparatus.

According to a first aspect of the invention, a method is provided for calibrating a measurement scale in a scanning head using a reference artefact, the method comprising the steps of;

(i) rotating a surface sensing device mounted on the scanning head about at least one axis of the scanning head to move the surface sensing device into a plurality of different angular orientations relative to the reference artefact;

(ii) measuring, with the surface sensing device, at least one property of the reference artefact at each of the different angular orientations of step (i); and (iii) creating an error map or function for at least one measurement scale of the scanning head using the properties of the reference artefact measured in step (ii).

The present invention thus provides a convenient technique for calibrating the measurement scale or scales that measure the angular orientation of the rotary axis or axes of a so-called active or motorised scanning head. In particular, the method involves rotating a surface sensing device (e.g. a measurement probe) about the one or more axes of the scanning head into a plurality of different angular orientations. At each of these different angular orientations, at least one property of the reference artefact (e.g. a calibrated dimension of the artefact and/or the position of an artefact feature) is measured using that surface sensing device.

Analysis of the measured properties, for example comparison of the measured properties with known (e.g. predetermined or calibrated) properties of the reference artefact or variations in the measured position of one or more fixed position features of the reference artefact, allows an error map or function to be established for the one or more measurement scales. This error map or function can then be applied to subsequent measurements that are taken with the scanning head thereby reducing, or removing, any errors associated with the one or more measurement scales (e.g. of the encoders) that measure the rotational orientation of the scanning head.

The method of the present invention has the advantage, compared with the above mentioned prior art methods of calibration that employ a calibrated rotary stage, of not requiring the accurate alignment of the axes of rotation of the scanning head with the axes of rotation of a calibrated rotary stage. Furthermore, it is not possible in such prior art methods to deconvolute errors arising from eccentricity between the calibrated rotary stage and the axes of rotation of the scanning head from the errors associated purely with the measurement scales of the scanning head. In contrast, the present invention provides a method in which no such eccentricity errors are present thereby providing a calibration technique that can not only be implemented more easily than known techniques but can also provide improved calibration accuracy.

Advantageously, the reference artefact is a calibrated artefact having at least one calibrated (e.g. known or accurately pre-measured) property. Step (iii) may then advantageously comprise creating the error map or function from the difference between the properties of the reference artefact measured in step (ii) and the calibrated property or properties of the reference artefact. The error map or function may also or alternatively be created from variations in the measured property (e.g. the measured position of a fixed position feature of the artefact) at each of the different angular orientations at which that property is measured.

Conveniently, step (ii) comprises using the scanning head to rotate the surface sensing device about at least one axis of the scanning head during each measurement of a property of the reference artefact. In other words, the surface sensing device is preferably moved by the scanning head during each of the measurements taken in step (ii). Advantageously, any scanning head motion provided in step (ii) when acquiring measurements is over a smaller angular range than the motion that is provided in step (i) for placing the scanning head into the different angular orientations. For example, step (i) may involve rotating surface sensing device about a first axis of the scanning head in steps of, say, 10° whilst the measurements of step (ii) may involve providing rotational motion about one or more axes of the scanning head of only a few degrees or less. It is also preferred that the different angular orientations selected used in step (i) are distributed (e.g. evenly distributed) over the operable angular range of the at least one rotary axis of the scanning head that is being calibrated.

The scanning head may be mountable or mounted to the moveable arm or quill of co-ordinate positioning apparatus (e.g. a coordinate measuring machine) so that the whole of the scanning head can be moved (e.g. translated along x, y and z axes) relative to the reference artefact. For example, the scanning head may comprise a base portion attachable to the moveable arm of a co-ordinate positioning apparatus. Advantageously, step (ii) may then comprise providing only minimal motion of the base portion of the scanning head during each of the measurements of a property of the reference artefact. For example, motion of the base portion during step (ii) may be restricted to movements of less than 5 cm, less than 3 cm or less than 1 cm; preferably, no more than a few millimeters of motion is provided. Step (ii) may also conveniently comprise keeping the base portion of the scanning head stationary or substantially stationary during each of the measurements of a property of the reference artefact. Using the scanning head to providing the majority, or all, of the motion of the surface sensing device during step (ii) has the advantage of minimising any errors in the measured properties of the reference artefact due to errors in the position (e.g. x, y, z) measurements of the co-ordinate positioning apparatus.

Any property of the reference artefact may be measured in step (ii). The same property or a different property of the reference artefact may be measured at each of the different angular orientations. Advantageously, step (ii) comprises measuring at least one calibrated dimension of the reference artefact. For example, step (ii) may comprise (depending on the artefact used) measuring sphere radius, ring gauge diameter, or cube dimensions etc. Step (ii) may advantageously comprise measuring the position of at least one feature of the reference artefact. For example, the position of a single feature may be measured with the surface sensing device placed into a plurality of different angular orientations or the position of a different one of a plurality of features may be measured when the surface sensing device is placed into each of the plurality of different angular orientations.

Advantageously, the reference artefact comprises an array or plurality of features. Preferably, the relative positions of the features of the array are known or calibrated. For example, the relative positions of the features may have been measured previously using a high accuracy measurement technique and/or high accuracy co-ordinate positioning apparatus. In a preferred embodiment described below, the reference artefact may comprise an array of balls or other features located at a substantially invariant radius about a central axis and separated by substantially equal angular spacings about that central axis.

As outlined above, the scanning head may comprise a base portion that is attachable or attached to the moveable platform of a co-ordinate positioning apparatus. If a reference artefact comprising an array of features is used in the method, the base portion of the scanning head may conveniently be held substantially stationary during step (i). Step (i) may then comprise using only the scanning head to move (i.e. rotate about the at least one axis of the scanning head) the surface sensing device into an operative sensing orientation relative to each feature of the array of features in turn. In addition, as mentioned above, the base portion of the scanning head may conveniently be held substantially stationary or moved by a minimal amount during the measurements of step (ii). In this manner, any positional errors associated with the co-ordinate positioning apparatus can be excluded when calibrating the measurement scale or scales of the scanning head. It would also be possible to dispense with co-ordinate positioning apparatus when calibrating the scanning head using such a method and simply use a jig to hold the scanning head in the desired position relative to the reference artefact.

The method of the present invention may also be advantageously implemented using a reference artefact that comprises a single feature. The method may thus be implemented using a reference artefact of known type (e.g. a calibrated sphere of known radius) that may also be used during other parts of the process of calibrating coordinate positioning apparatus. It is, for example, commonplace for a calibrated sphere to be supplied with co-ordinate positioning apparatus for use in calibrating, or checking the calibration, of the scales of such apparatus.

If a single feature is measured with the surface sensing device rotated into different angular orientations by the scanning head, it is preferred that the scanning head is attached to the moveable arm of a co-ordinate positioning apparatus. For example, a base portion of the scanning head may be attached to the moveable arm or quill of co-ordinate positioning apparatus. Step (i) may then also comprise the step of moving the scanning head relative to the reference artefact when the surface sensing device is moved into each of the plurality of different angular orientations. In this manner, the surface sensing device can be brought into multiple surface sensing relationships relative to the single feature of the reference artefact. For example, the surface sensing device may be aligned with a calibrated (e.g. known radius) sphere from a plurality of different directions.

Although implementing the method of the present invention using a reference artefact comprising a single (e.g. calibrated) feature typically makes it necessary to move the scanning head using co-ordinate positing apparatus between taking the required measurements of the reference artefact, movement of the scanning head using the co-ordinate positing apparatus during step (ii) is not necessary or at least can be minimised. The measurements of the reference artefact taken in step (ii) may thus be substantially free of any coordinate positioning apparatus related errors, especially if step (ii) comprises measuring a dimension of the feature of the reference artefact (e.g. if a measurement of sphere radius is used).

The reference artefact used in the method of the present invention may comprise one feature or a plurality or array of features. If a plurality or array of features are provided, these features may be of the same or different type. Each feature may have a dimension that can be readily measured by measuring the position of a plurality of points on its surface, and/or it may have a position that can be easily determined by measuring the position of one or more points on its surface. Advantageously, the reference artefact comprises at least one of a sphere, ring gauge, bore, boss or cube. The skilled person would be aware of the numerous other features that may be provided.

Any type of surface sensing device may be mounted to the scanning head. The surface sensing device may be permanently mounted to the scanning head (e.g. formed integrally with the scanning head) or at least part of the surface sensing device may be mounted to the scanning head in a releasable manner. The surface sensing device may be a contact device (e.g. a measurement probe having a deflectable stylus) or a non-contact device (e.g. an optical or capacitive measurement probe). Measurement probes of this type are known to those skilled in the art.

Advantageously, the surface sensing device mounted to the scanning head comprises a (contact or non-contact) scanning probe. Preferably, the scanning probe is a so-called scanning or analogue measurement probe having a deflectable stylus and a sensor for measuring the amount of stylus deflection. If such a scanning probe is used, step (ii) advantageously comprises measuring the property of the reference artefact at each of the different angular orientations by scanning along a path on the surface of the reference artefact. For example, the stylus tip of a contact scanning probe may be used to trace or scan along a path on the surface of a feature of the artefact; stylus deflection data measured during the scan can then be used to determine the position of multiple points along the scan path from which the required artefact dimension and/or position of the artefact feature can be determined.

In a preferred embodiment, the reference artefact comprises at least one sphere and step (ii) comprises, for each of the different angular orientations, the step of scanning along a circular path on the surface of a sphere to establish the radius and/or centre position of that sphere. Preferably, the circular path on the sphere is located at a latitude of between 30° and 40°; e.g. at 35°. For a sphere of known radius, this allows the sphere centre position to be determined with approximately the same level of uncertainty in all three dimensions (x,y,z).

The surface sensing device mounted to the scanning head may conveniently comprise a so-called touch trigger probe. The touch trigger probe may be of contact type that has a deflectable stylus for contacting an object. A touch trigger probe does not, by definition, provide a measure of the amount of stylus deflection but instead issues an output or trigger signal when stylus deflection has exceeded a certain threshold. If a touch trigger probe is used, step (ii) may comprise measuring a plurality of discrete points on the surface of the reference artefact at each of the different angular orientations. These measured surface points may then be used to determine a dimension or position of a feature of the reference artefact.

The scanning head calibrated using the above described method may comprise a so-called active head or motorised scanning head. In particular, the present invention can conveniently be used to calibrate the measurement scales of a two-axis motorised scanning head that comprises a fixed part or base portion that is attachable to co-ordinate positioning apparatus, a first moveable part that can rotate about a first axis (A1) relative to the base portion and a second moveable part for retaining a surface sensing device that can rotate about a second axis (A2) relative to the first moveable part. In such an example, step (i) of the method may comprise rotating the surface sensing device about the first axis and/or the second axis to bring it into a surface sensing relationship with the reference artefact. Each measurement acquired in step (ii) of the method may also be made by rotating the surface sensing device about the first axis and/or the second axis so that it measures the position of points on the surface of the reference artefact that are necessary to establish the required property or properties of that reference artefact. Each axis of rotation of the scanning head may comprise at least one position encoder that provides a measure of the rotational position of that axis and thus comprises the measurement scale being calibrated.

It should be noted that if a scanning head is used which has two or more rotational axes, it is possible to calibrate the measurement scales of each axis simultaneously or in series using the method of the present invention. Furthermore, the exact method that is used to calibrate one of the axes may or may not be different to that which is used to calibrate the other axis or axes. For example, it may be appropriate to calibrate the measurement scale of a first axis of the scanning head using a method that employs a first reference artefact whilst the measurement scale of a second axis of the scanning head second axis is calibrated using a method that employs a second (different) type of reference artefact. The optimum calibration method selected for each rotational axis will thus depend on the type of scanning head used and in particular the angular range associated with the rotational axis or axes of the scanning head that are being calibrated.

According to a second aspect of the invention, a scanning head system for co-ordinate positioning apparatus is provided, wherein the scanning head system stores an error map or function calculated using the method outlined above. The scanning head system may comprise a scanning head and a control interface. The scanning head or control interface may, for example, comprise an electronic memory that stores the error map or function.

According to a third aspect of the invention, there is provided a method of calibrating a scanning head using a calibration artefact that comprises a plurality of calibrated features, the method comprising the steps of; (i) rotating a surface sensing device mounted on the scanning head about at least one axis of the scanning head to move the surface sensing device into a surface sensing relationship with a selected calibrated feature of the plurality of calibrated features; (ii) Measuring, with the surface sensing device, at least one property of the selected calibrated feature of the calibration artefact; (iii) repeating steps (i) and (ii) with at least one further selected calibrated feature; and (iv) creating an error map or function for at least one measurement scale of the scanning head from the difference between the properties of the calibration artefact measured in step (ii) and the calibrated properties of the calibration artefact. Advantageously, motion of the surface sensing device during step (i) is provided solely by rotation of the scanning head about the at least one axis of the scanning head.

According to a fourth aspect of the invention, there is provided a method of calibrating a scanning head using a reference artefact comprising a first feature, the method comprising the steps of; (i) placing a surface sensing device mounted on the scanning head in a first angular orientation relative to the first feature, (ii) measuring, with the surface sensing device, a property of the first feature of the reference artefact; (iii) using the scanning head to rotate the surface sensing device about at least one axis of the scanning head such that the surface sensing device adopts a different angular orientation relative to the first feature of the reference artefact; (iv) remeasuring, with the surface sensing device, the property of the first feature of the reference artefact; and (v) creating an error map or function for at least one measurement scale of the scanning head from the measured properties of the first feature of the reference artefact that are acquired during steps (ii) and (iv). Steps (iii) and (iv) may be repeated, in series, a plurality of times. The scanning head may conveniently be mounted to the moveable arm of co-ordinate positioning apparatus and step (iii) may also comprises the step of using the moveable arm to move the scanning head.

According to a fifth aspect, the present invention provide a method for calibrating a scanning head, comprising the steps of; (i) using a surface sensing device mounted on the scanning head to measure a property of a reference artefact; (ii) repeating the measurement of step (i) with one or more rotational axes of the scanning head rotated through a different angular range; and (iii) creating an error map or function for the one or more measurement scales of the one or more rotational axes of the scanning head from the measured properties of the reference artefact acquired in step (i).

The present invention thus provides a method for calibrating a scanning head using a calibration artefact, the method comprising the steps of (i) using a surface sensing device mounted on the scanning head to measure the calibration artefact and provide a first measured calibration property, (ii) rotating the surface sensing device about at least one axis of the scanning head to alter the angular orientation of the surface sensing device relative to the calibration artefact, (iii) using the surface sensing device to measure the calibration artefact and provide a second measured calibration property, and (iv) producing an error map or function for the scanning head by comparing the first measured calibration property and the second measured calibration property to known calibrated properties of the calibration artefact.

The present invention also provides a method of calibrating a measurement scale in a scanning head using a calibration artefact comprising one or more calibrated spheres, the method comprising; (a) rotating a surface sensing device mounted on the scanning head about one axis of the scanning head to align the surface sensing device with the at least one sphere at different angles about said at least one sphere; (b) measuring said at least one sphere with the surface sensing device at each position of the scanning head; (c) comparing measured dimension of the at least one sphere determined from the measurements with their calibrated dimensions; and (d) creating an error map or function from the difference in the measured and calibrated dimensions of the sphere. Preferably the dimensions comprise at least one of the sphere centre or sphere radius of the at least one sphere. The at least one sphere may comprise a single sphere. It may also comprise an array of spheres arranged in a circle or arc about a central axis.

Also described herein is a calibration artefact, comprising: a base; and an array of features mounted on the base, said features being arranged about a central axis, said features having substantially equal angular distances between them and at an equal radius from the central axis. Preferably the features are spheres. The features may be arranged in an arc or circle. A method of calibrating a measurement scale in a scanning head using such a calibration artefact is also described herein, the method comprising; (a) aligning a rotational axis of the scanning head with the central axis of the calibration artefact; (b) rotating a surface sensing device mounted on the scanning head about the central axis, to align the surface sensing device with the feature; (c) Measuring said feature with the surface sensing device; (d) Repeating steps (b) and (c) for other features on the calibration artefact; (e) comparing the measured positions of the features with their calibrated positions; and (f) creating an error map or function from the difference in the measured and calibrated positions of the features. Preferably the features comprise spheres. Preferably the step of measuring the feature comprises measuring the centre of the sphere. The step of measuring the feature may comprise taking one or more discrete measurements of the feature or scanning a surface of the feature.

The present invention also provides a method of calibrating a measurement scale in a scanning head using a calibration artefact comprising a calibrated sphere, the method comprising; (a) rotating a surface sensing device mounted on the scanning head about one axis of the scanning head to align the surface sensing device with the sphere at different angles about the sphere; (b) measuring the sphere with the surface sensing device at different positions of the scanning head; (c) comparing the dimensions of the sphere determined from the measurements with their calibrated dimensions; and (d) creating an error map or function from the difference in the measured and calibrated dimensions of the sphere.

Examples of preferred embodiments of the invention will now be described with reference to the accompanying drawings wherein.

Figure 1:
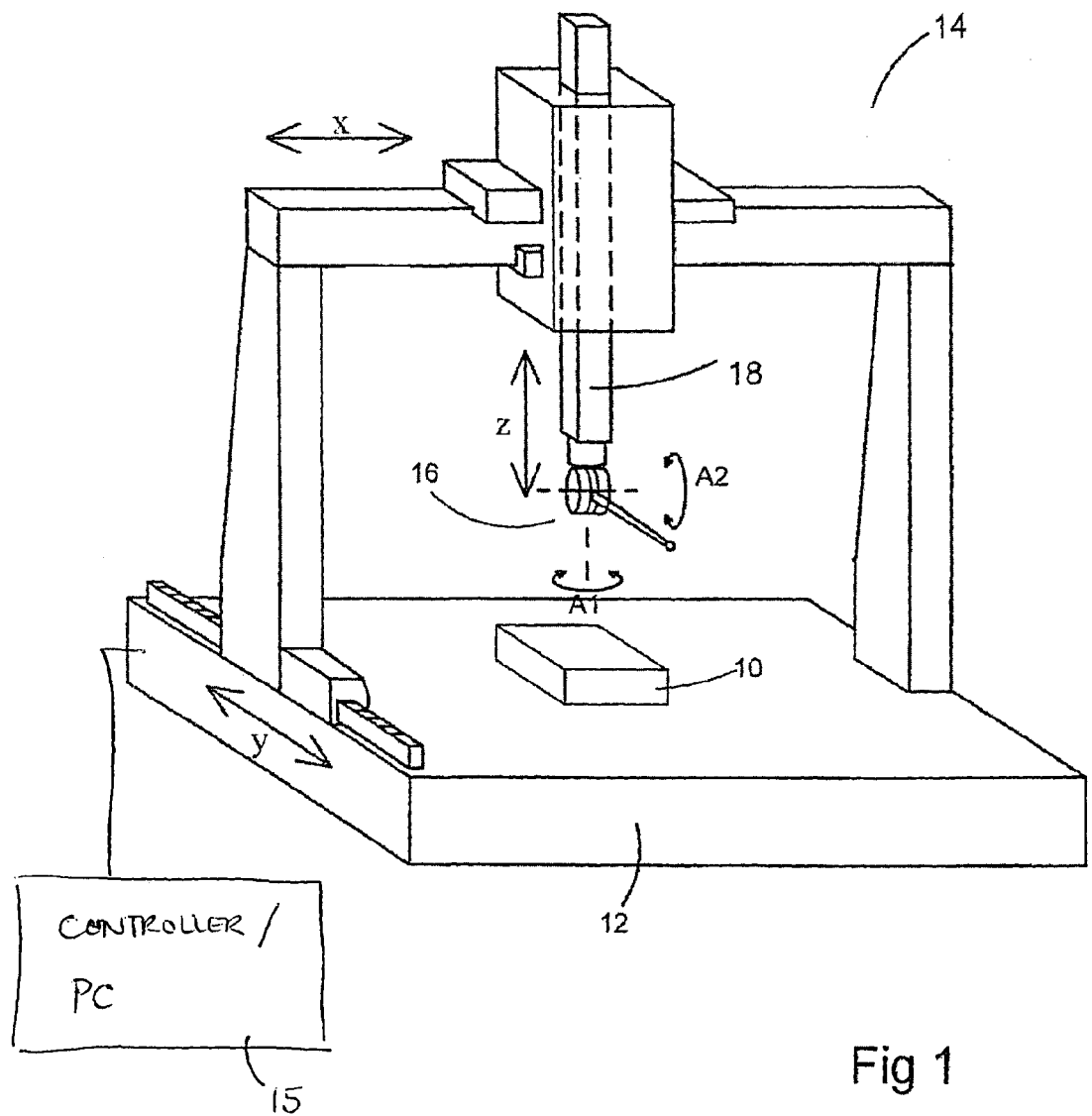
FIG. 1 is an elevation of a coordinate measuring machine including scanning apparatus according to the present invention.

FIG. 1 illustrates a motorised scanning head mounted on a coordinate positioning apparatus, such as a coordinate measuring machine (CMM). A workpiece 10 to be measured is mounted on a table 12 of the CMM 14 and a motorised scanning head 16 is mounted on a quill 18 of the CMM 14. The spindle is driveable in the directions X,Y,Z relative to the table by motors in a known manner. Other types of coordinate positioning apparatus may be used, such as a machine tool, manual CMM or robotic arm.

Figure 2:
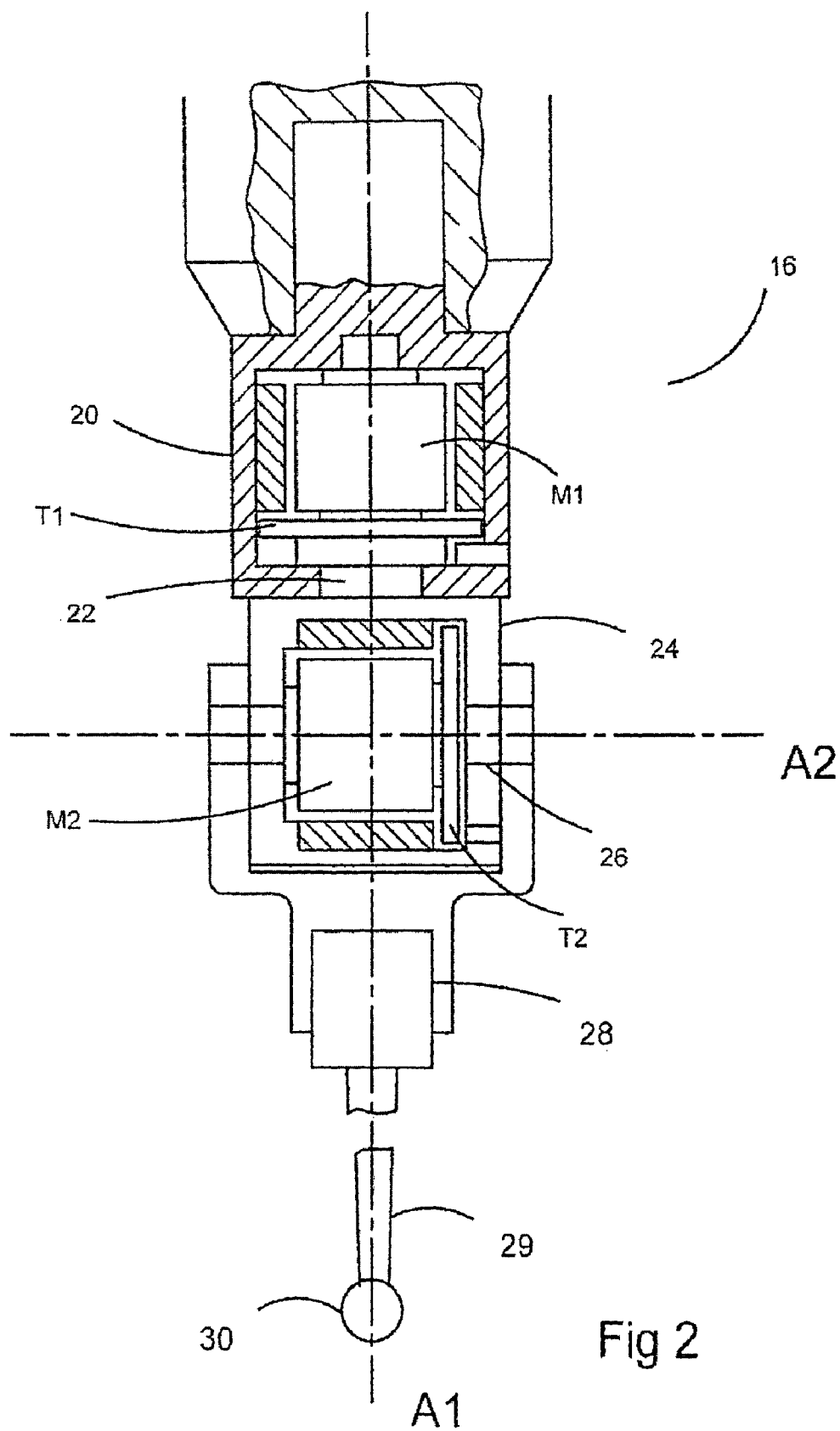
FIG. 2 is a cross-sectional view of a motorised scanning head.

As illustrated in FIG. 2, the motorised scanning head 16 comprises a fixed part formed by a base or housing 20 supporting a movable part in the form of a shaft 22 rotatable by a motor M1 relative to the housing 20 about an axis A1. The shaft 22 is secured to a further housing 24 which in turn supports a shaft 26 rotatable by a motor M2 relative to the housing 24 about an axis A2 perpendicular to the axis A1.

A surface sensing device, in this example a probe 28 with a stylus 29 having a workpiece contacting tip 30 is mounted onto the motorised scanning head. The arrangement is such that the motors M1,M2 of the head can position the workpiece-contacting tip angularly about the axes A1 or A2 and the motors of the CMM can position the motorised scanning head linearly anywhere within the three dimensional coordinate framework of the CMM to bring the stylus tip into a predetermined relationship with the surface being scanned. In this example, the motors M1 and M2 are direct drive, which enables the motors to act quickly in response to demands from the controller. Other types of drive arrangement would be possible.

Linear position transducers are provided on the CMM for measuring linear displacement of the scanning head and angular position transducers T1 and T2 are provided in the scanning head for measuring angular displacement of the stylus about the respective axes A1 and A2.

The probe illustrated in FIG. 2 is a scanning probe and has a deflectable stylus 29 and transducers in the probe measure the amount of stylus deflection. A touch trigger probe may also be used, which detects when the stylus has deflected but not the extent of deflection. Alternatively a non contact probe may be used, for example an optical, capacitance or inductance probe.

A controller or PC 15 provides drive signals to the CMM 14 and scanning head 16 and receives inputs from the transducers in the CMM, scanning head and measurement probe.

The transducers T1 and T2 in the scanning head are typically encoders which comprise a rotary measurement scale and read head. In order to provide good accuracy, it is preferably that each or both of these transducers are calibrated.

Figure 3:
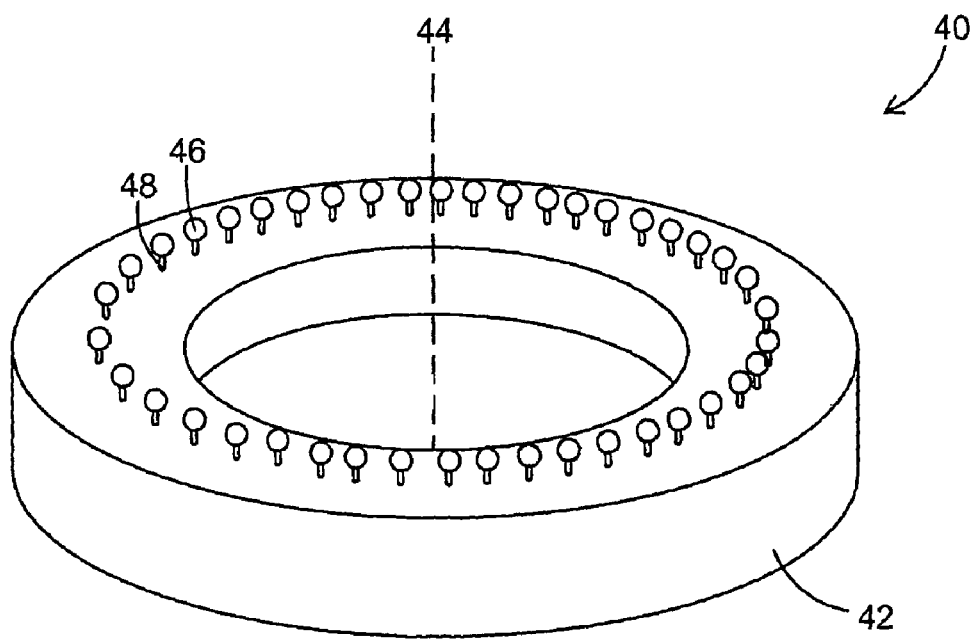
FIG. 3 illustrates a ring of spheres calibration artefact.

FIG. 3 illustrates a reference or calibration artefact 40 used for calibrating the encoders in the scanning head 16. The calibration artefact 40 comprises a base 42 having a central axis 44 and an array of features, in this case spheres 46 mounted about the central axis. Each sphere 46 is mounted onto the base 42 via a stem 48. The spheres are angularly spaced at substantially equal distances from one another.

Figure 4:
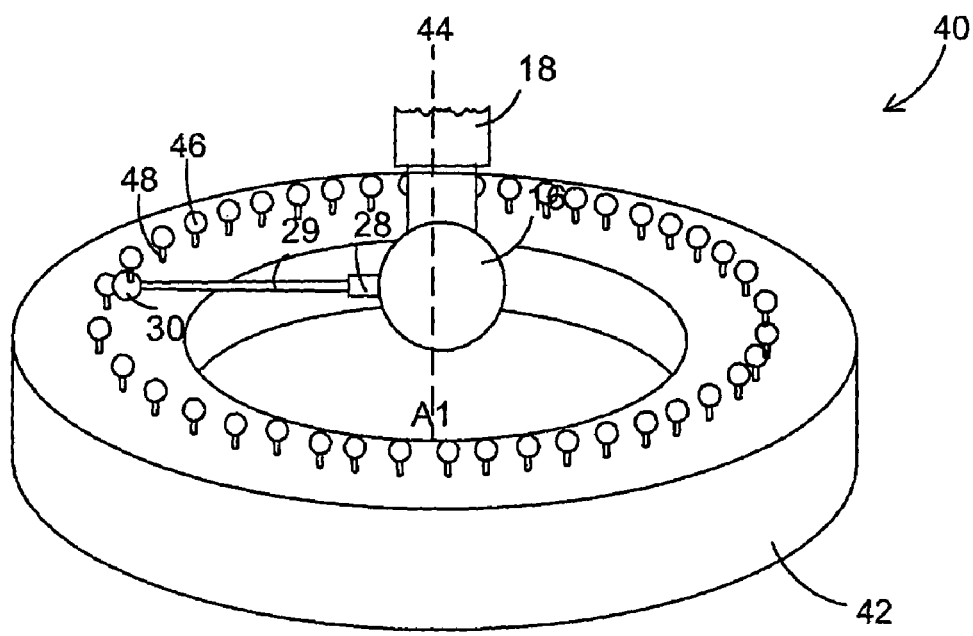
FIG. 4 illustrates the scanning head and measurement probe measuring the ring of spheres calibration artefact.

The method of using the calibration artefact to calibrate the encoders of the A1 axis in the scanning head will now be described with reference to FIGS. 4-5. FIG. 4 shows a surface sensing device, in this case a measurement probe 28, mounted on the scanning head 16.

In a first step, the motorised scanning head 16 is aligned with the central axis 44 of the calibration artefact 40 (i.e. the A1 axis is aligned with the central axis) and the A2 head angle is adjusted to bring the measurement probe 28 to the desired angle, for example 90°. The central axis of the calibration artefact 40 can be determined by measuring three of the spheres.

The A1 head angle is then adjusted to align the surface sensing device 16 with the first sphere 46 to be measured. This alignment may be so that the surface sensing device 28 is aligned between the central axis 44 and with the centre of the sphere 46.

A method of determining the centre of a sphere, such as sphere 46, will now be described. The centre of the sphere is determined in a known fashion by taking a sufficient number of measurements of points on its surface. These multiple measurements of the surface may be achieved by taking a plurality of discrete measurements, for example using a touch trigger measurement probe. The multiple measurements may also be achieved by scanning the surface using a scanning measurement probe (either contact or non contact). For example, the stylus of a contact scanning probe may be driven along a path on the surface of the sphere.

During the measurement of the sphere, the required motion of the surface sensing device is preferably provided as much as possible by the scanning head. In particular, motion of the coordinate positioning apparatus (a CMM in this case) is preferably limited to only a few millimeters, so that CMM motion does not affect measurement quality.

If the measurements are discrete points, e.g. using a touch trigger probe, the CMM is moved in X,Y and Z and/or the head is moved in the A1 and A2 axis to move the surface sensing tip to the correct positions.

A circular profile may be scanned using motion of the scanning head only or a helical profile may be scanned using circular motion of the scanning head whilst also using the CMM to move the scanning head along a line. In this manner, multiple points along a scan path on the sphere surface can be established.

If a circular profile scan is used, it has been found that the best results are achieved when the circular profile is positioned at a latitude of around 35° and a fixed radius R is assumed. The sphere centre in three dimensions (x,y,z) can then be determined with a sphere best fit process in which the sphere radius is assumed constant.

Figure 5:
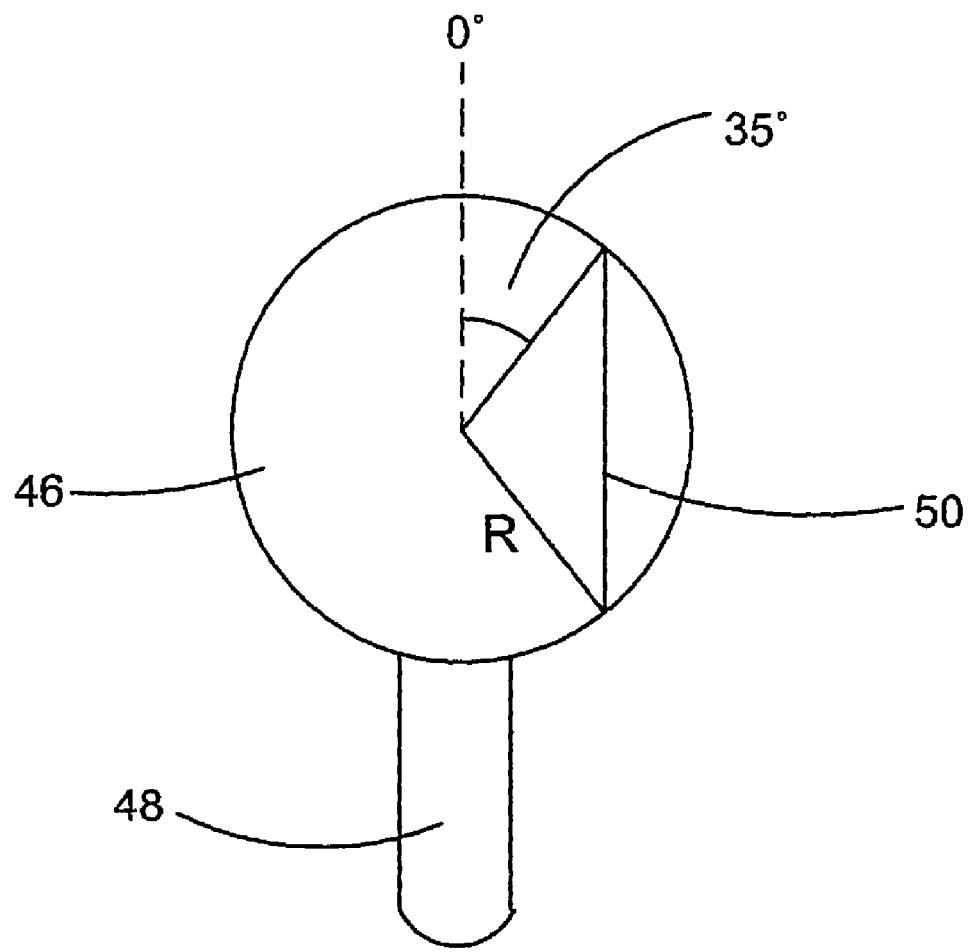
FIG. 5 illustrates a sphere of the calibration artefact of FIGS. 3 and 4.

FIG. 5 illustrates the circular profile 50 on the sphere 46, at a latitude of 35° and fixed radius R.

As mentioned above, when a sphere is measured using a single scanning circle, the latitude of this circle has been found to have an effect on the quality of the three co-ordinates (x,y,z) of the determined centre. If the scanned circle is at the equator, the XY coordinates are well constrained but the centre Z coordinate accuracy is very poor. If the scanned circle is near the pole, the Z coordinate is good but the XY position accuracy is degraded. There exists a position for the circular data that realizes the bests compromise between the accuracy of the XY coordinates and the Z coordinate of the sphere centre. At a latitude of between 30° and 40°, the accuracy of the 3 co-ordinates is approximately equivalent and the quality of the XY centre is still very good. Optimal results have been found to be achieved at a latitude of around 35°. This optimum compromise has been determined using a Monte Carlo simulation that studies the effect of the system noise on the result of the special best fit given a data distribution on the sphere.

The calibration artefact 40 has a local co-ordinate system. A plane provides the principal direction of the local co-ordinate system and is defined by best fitting with the centre of the spheres 46, with one sphere chosen as a reference. A secondary direction of the local co-ordinate system is determined from the centre of the best-fitted circle. In this local co-ordinate system, each of the sphere centres has a cylindrical set of co-ordinates (R,H,T where R=radius, H=height and T=angular coordinates). In this local co-ordinate system, T provides the angular calibration of the calibration artefact.

Once the sphere has been measured by the surface sensing device (e.g. using the above described method), the motorised scanning head is rotated about the A1 axis to position the surface sensing device adjacent the next sphere. Each sphere of the artefact is measured in turn in the same fashion providing a measured sphere centre position for each sphere.

Once all the spheres on the artefact have been measured, the measurement data of the sphere centres can be compared with the calibrated sphere centre position and the differences used to calibrate the encoder that is used to measure the rotary position of the A1 axis. This calibration may be done by creating an error map or error function, for example a sine wave or polynomial function.

Figure 6:
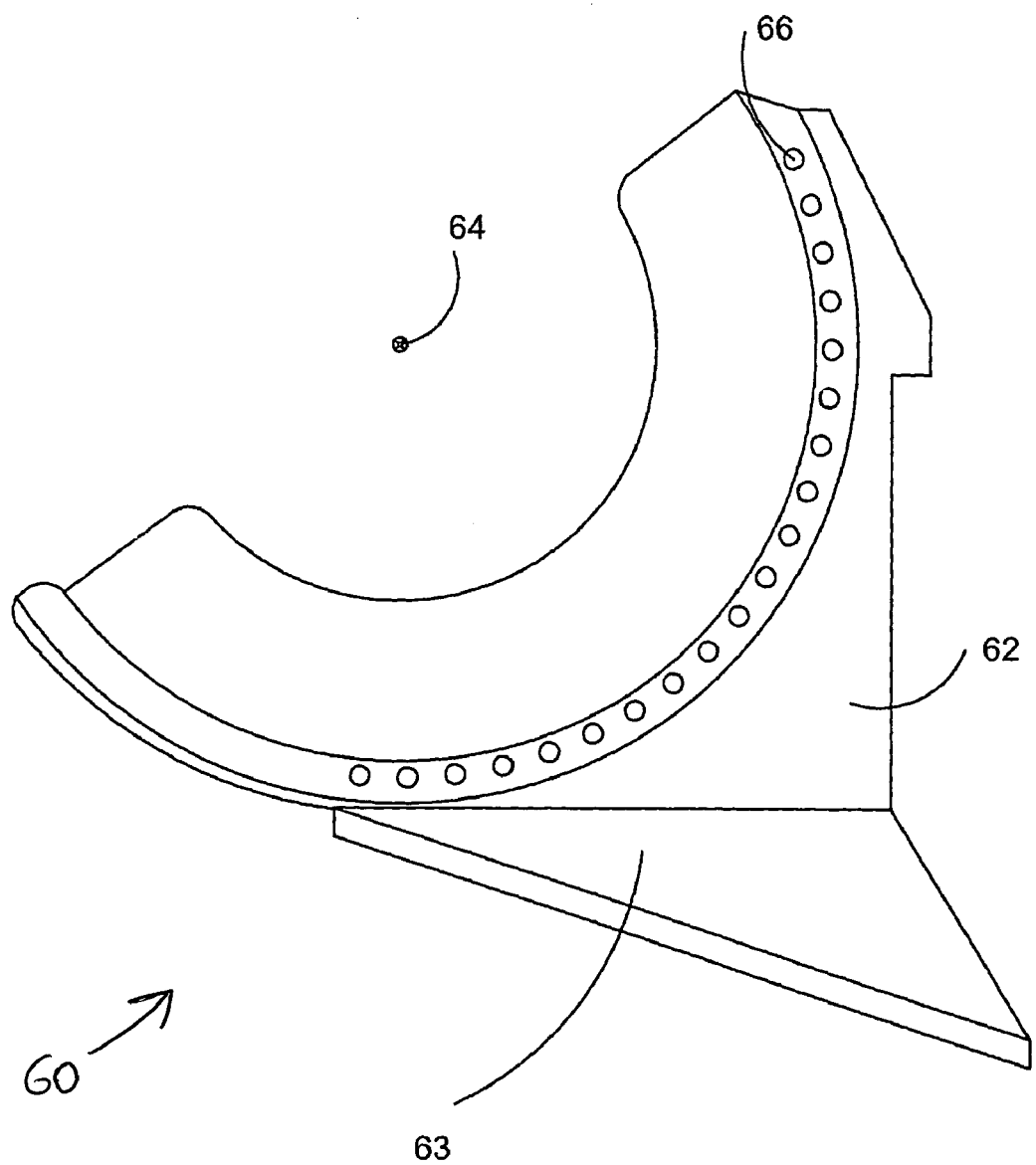
FIG. 6 illustrates an arc of spheres calibration artefact.
Figure 7:
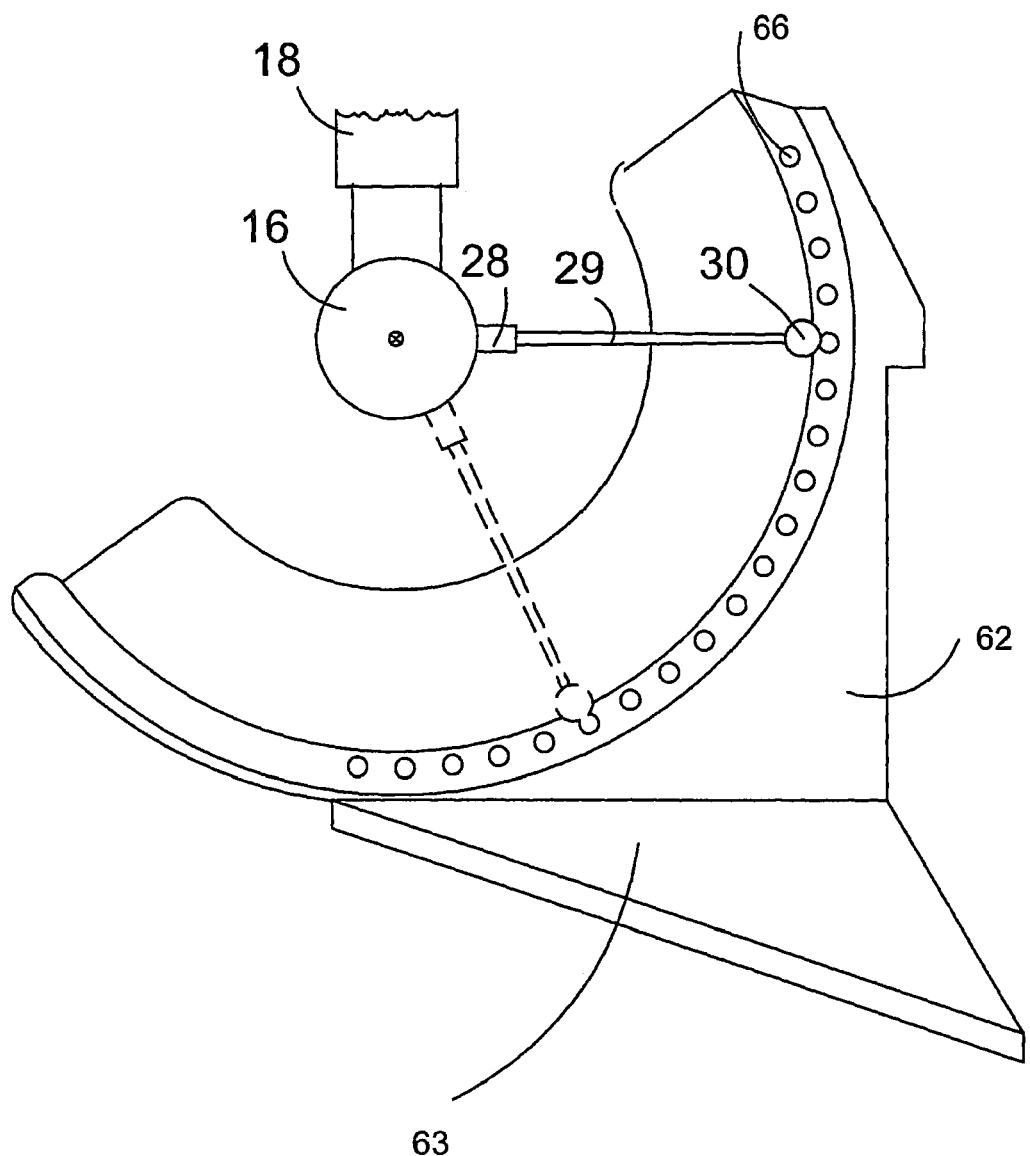
FIG. 7 illustrates the scanning head and measurement probe measuring the arc of spheres calibration artefact.
Figure 8:
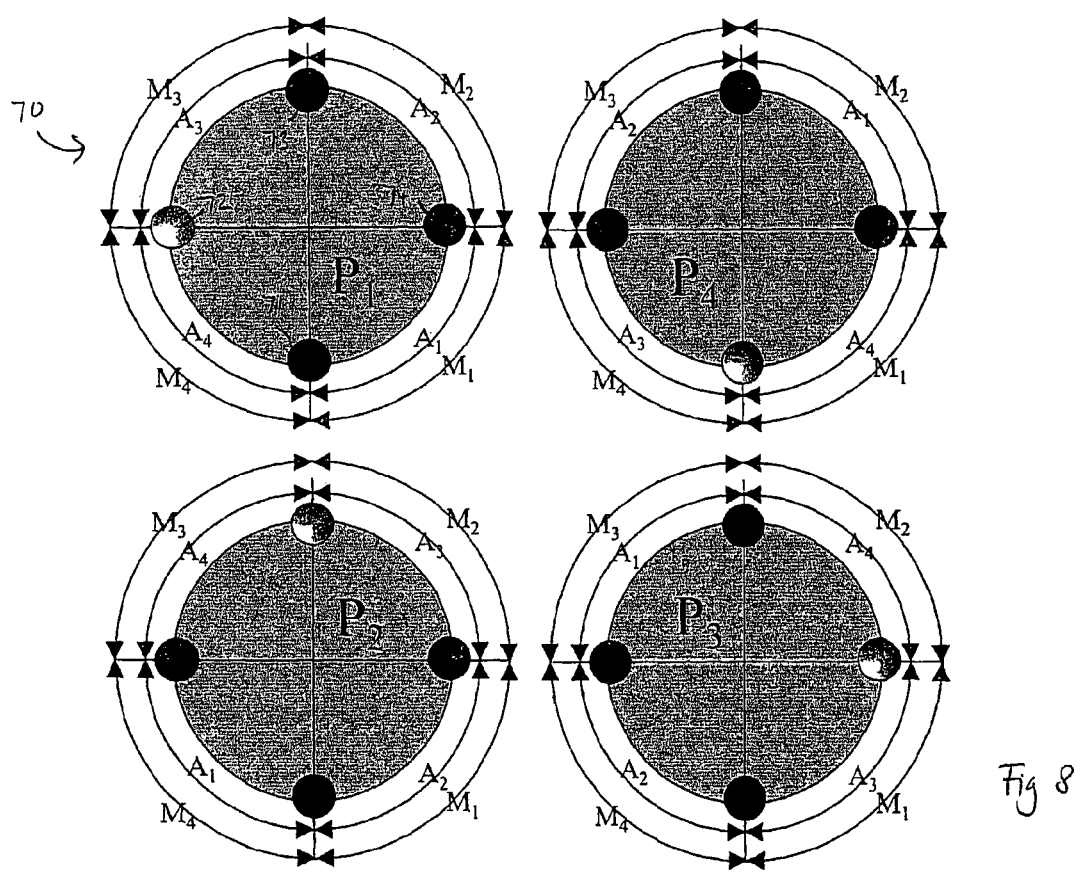
FIG. 8 illustrates a method for calibration of the artefact.

The encoders of the A2 axis may also be calibrated using a similar method. FIG. 6 shows a calibration artefact 60 that can be used for calibrating the A2 axis. It is similar to the calibration artefact illustrated in FIG. 3, but the base 62 is mounted at 90 degrees to mount 63 and is an arc rather than circular. Likewise, the spheres 66 are distributed in an arc about a central axis 64. FIG. 7 illustrates the motorised scanning head 16 with a measurement probe 28 mounted thereon positioned for measuring the calibration artefact 60. The balls 66 are located so that the A2 head angles can be moved throughout its working range, e.g. from 0 to 120° or from −120° to +120°.

During the calibration routine, the scanning head 16 is positioned with its A2 axis aligned with the central axis 64 of the calibration artefact. This alignment is done easily using the A1 axis. The A2 head angle is adjusted to position the surface sensing device 28 adjacent each ball 66 in turn to take the appropriate measurement of sphere centre position in a similar manner to that described above.

It should be noted that, in this example, the method of calibration about the A2 axis differs slightly from that used for the A1 axis. When calibrating about the A1 axis, each sphere may be measured with a circular profile. This circular profile requires motion about both the A1 and A2 axes. However, because each sphere has the same z coordinates, the same motion of the A2 axis will be required for the measurement of each sphere. The effect of the head geometry errors on the angular position of each ball is identical. Therefore it does not induce any errors in the calibration results.

However, when calibrating about the A2 axis, motion of both the A1 and A2 axes are again required for a circular scan but the amount of motion about the A1 and A2 axes will differ for each sphere. The range used on the A1 axis is bigger for the lowest spheres, hence the effect of the head geometry errors will be different for each sphere and more visible for the lowest sphere. For accurate measurement therefore, each sphere is preferably measured by taking discrete measurement points. However, if the measurement of the calibration artefact takes too long, thermal drift can have an effect. This may be overcome by taking discrete measurement points of the first three or four spheres and then scanning the remaining spheres as the range on the A1 axis has become small enough to not induce significant errors.

The measurement data is used to create an error map or function in the same way as for the A1 axis.

The use of a ring of spheres calibration artefact of the type describe above in the calibration process has been found to have several advantages.

In the conventional method of calibrating an encoder against another encoder, the alignment between the axes is critical. Any eccentricity creates a first order error (having one undulation per revolution). Using the ring of spheres, the first order error is minimized by the fact that the analysis of the data is calculated in a local co-ordinate system attached to the artefact. If an eccentricity exists, a ball that is positioned at an angle α is measured at an angle α+error, where the error can be represented as a first order function, such as:

Error=Amplitude*sin(α+phase)

In the case of a prior art encoder/encoder calibration that error is directly included in the calibration. However, with the ring of spheres method of the present invention, only the variation of the encoder error between the angle α and α+error affects the calibration. The encoder errors generally have a slow rate of change; the error introduced is therefore extremely small which demonstrates why the alignment in the method of the present invention does not need to be accurately configured.

The size of the spheres in the calibration artefact is preferably such that the variation of the CMM errors is very small during the measurement. In this example, the spheres have a diameter of 8 mm. CMM errors over such a small range are typically negligible.

It should also be noted that the analysis of the ring of spheres provides more information than the encoder/encoder calibration. Use of the local cylindrical co-ordinate system decouples the head error influencing the angular co-ordinate (i.e. the encoder error), the altitude co-ordinate which corresponds to the variation of the head axis alignment (i.e. the swash errors of the axis A1) and the radius variation that corresponds to the radial variation of the artefact sphere position that will include the thermal variation of the artefact. The ring of spheres therefore decouples the angular measurement from the artefact thermal variation and the eccentricity of the measurement set up. It allows also measurement of the swash error of the calibrated axis.

It should be noted that the above mentioned removal of thermal variations occurs when the artefact is mounted to the table of the CMM in a manner that prevents any thermal expansion effects causing a shift in the position of the centre axis of the artefact. For example, three balls may be provided on the artefact that engage three radially extending v-grooves provided on the table of the CMM. These balls and v-grooves are preferably provided approximately 120° apart. In this manner, any thermal expansion of the artefact a radial shift in the position of the balls but does not shift the central axis of the artefact.

The calibration artefacts used in the above method can be calibrated in several ways. For example, a calibrated CMM can be used to measure the position of each sphere from which the cylindrical co-ordinates are calculated as well as the centre position of the circle of the sphere relative to the three spheres that locate the artefact. By using a highly accurate calibrated CMM, high accuracy measurements of the artefact can be obtained.

The calibration artefact can also be calibrated by a method of self calibration. Such a method will now be described with reference to FIGS. 8A-8D in which a calibration artefact 70 is shown having only four spheres 71, 72, 73, 74 for clarity. The artefact 74 defines four angular steps (A1 to A4) that are measured by angular measurements (M1 to M4). The artefact is rotated by 90° four times, as shown in FIGS. 8A-8D.

Each angular step of the artefact is not exact and therefore the angular step can be written as a nominal value plus a correction:

$$A_1 = A + a_1 \quad [1]$$

where $A_1$ is the actual angular step, A is the nominal angular step and $a_1$ is the correction The measurement process is not free of error and each measurement value can be written as a nominal value plus a correction:

$$M_1 = M + m_1 \quad [2]$$

where $M_1$ is the actual measurement, M is the nominal measurement and $m_1$ is the correction.

As the calibration artefact is circular, one full rotation corresponds to exactly 360°. Therefore the sum of the artefact correction is null as well as the sum of the measurement corrections.

$$\Sigma A + a_1 = 360 => \Sigma a_1 = 0 \quad [3]$$

The four positions ($P_1$ to $P_4$) create 4*4 measurements mixing each artefact error with each measurement error. The following matrix shows all the associations:

$$\begin{bmatrix} P_1 \\ P_2 \\ P_3 \\ P_4 \end{bmatrix} = \begin{bmatrix} a_1 + m_1 & a_2 + m_2 & a_3 + m_3 & a_4 + m_4 \\ a_2 + m_1 & a_3 + m_2 & a_4 + m_3 & a_1 + m_4 \\ a_3 + m_1 & a_4 + m_2 & a_1 + m_3 & a_2 + m_4 \\ a_4 + m_1 & a_1 + m_2 & a_2 + m_3 & a_3 + m_4 \end{bmatrix} \quad [4]$$

The average of each column is free from the artefact correction and therefore provides the measurement correction. The average of each diagonal is free of the measurement correction and therefore provides correction of the artefact.

Each sphere centre position is created from an independent measurement and therefore the uncertainty of the average of many independent measurements is divided by the square root of the number of steps, by application of statistical rules. With a 90 sphere ring and a sphere centre measurement repeatability of 0.5 micrometers, the uncertainty of calibration of both the calibration artefact and the scanning head would be about 0.05 micrometers. If the distance between the intersection of the head axes and stylus tip is 250 mm, this is equivalent to 0.05 arc seconds.

Figure 9:
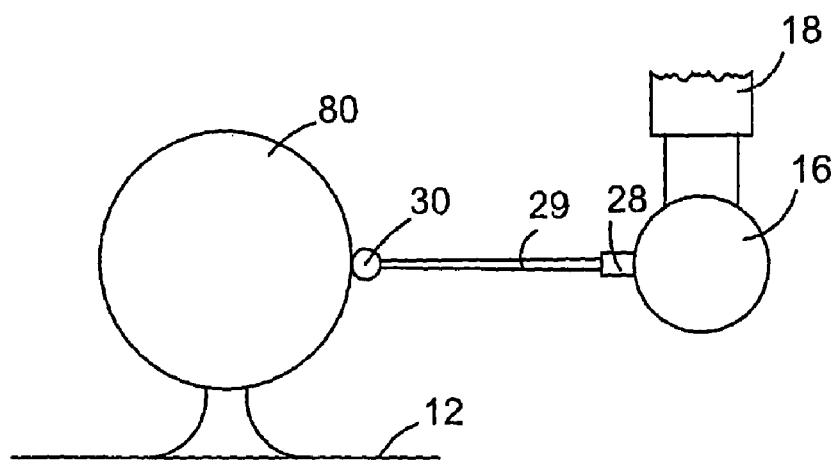
FIG. 9 illustrates the scanning head measuring a calibration sphere.

A second method of the present invention for calibrating the encoders of a motorised scanning head will now be described with reference to FIGS. 9 and 10. In particular, this second method employs a reference or calibration artefact in the form of a single sphere instead of using the ring of spheres calibration artefact described above.

The reference artefact, comprising a single calibration sphere 80, is mounted on the bed 12 of a coordinate positioning apparatus, such as a CMM. The motorised scanning head 16 of the CMM is located in a first position with the A1 and A2 head angles adjusted so that the measurement probe 28 is directed radially towards the centre of the sphere 80. The sphere is now measured by taking multiple measurement points about its surface, as with the ring of spheres calibration artefact. The measurements may be realised by discrete or scanning points which can be taken, for example, along a circular or helical path on the sphere. The measurement routine may be performed using only the scanning head motion or using a combination of scanning head motion and some (preferably limited) CMM motion.

After the sphere has been measured as described above, the motorised scanning head is moved by the CMM to a new position. This new position is selected to be at approximately the same radial distance from the sphere centre as the previous position but at a different angle relative to the sphere. In addition to providing CMM motion, the scanning head is also used to rotate the measurement probe about the A1 axis of the scanning head so that the measurement probe is again directed radially towards the centre of the sphere 80. The sphere is now re-measured in the manner described above to determine a further radius and/or sphere centre value. This process is repeated at multiple radial positions around the sphere.

Figure 10:
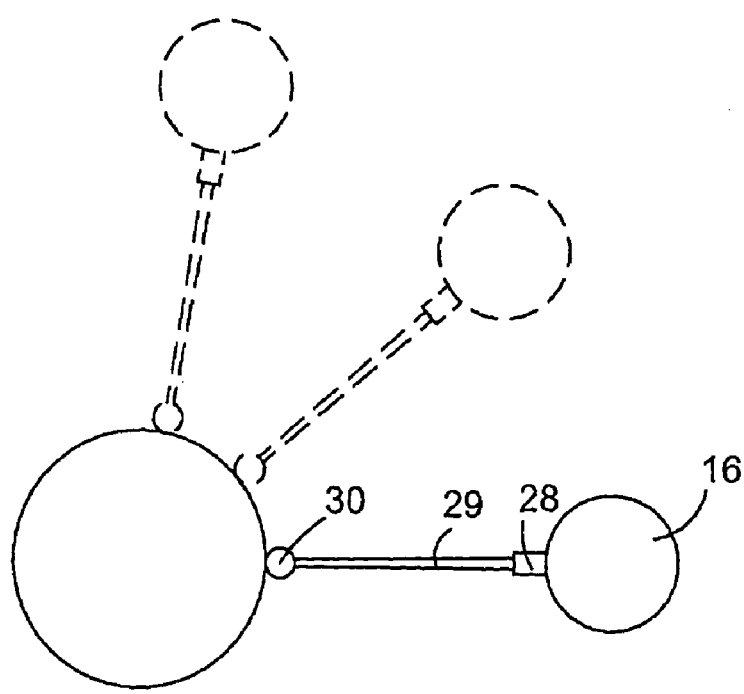
FIG. 10 illustrates the scanning head in two positions about a calibration sphere.

Referring to FIG. 10, the scanning head 16 and measurement probe 28 are shown in radial two positions about the calibration sphere 80. At each of these positions, the sphere is measured to determine a radius and/or sphere centre position value. Repeating such measurements at multiple different positions around the sphere thus results in multiple sphere measurements being acquired with the measurement probe rotated through multiple (different) angular positions about the A1 axis. It can thus be seen that variations in the measured sphere properties can arise from any errors in the angular orientation of the A1 axis as measured by the encoders of the scanning head. The variation of the sphere properties as a function of the measured angular orientation of the A1 axis can thus be used to produce an error map or function that can correct the measured angular orientation.

In this technique, it should be noted that both CMM and scanning head motion are required to move the scanning head to each new position about the sphere, with the measurement probe aligned radially with the centre of the sphere. The effect of any errors associated with measuring CMM position can thus have an effect on the accuracy of the method, but this depends on the sphere property that is being measured at the different positions.

If sphere radius is measured at each of the different scanning head positions, the effect of CMM errors is negligible and can typically be ignored. This is because dimensional measurements, such as sphere radius, are not significantly effected by any errors associated with the CMM because the CMM only needs to move a few millimeters during each sphere measurement; the CMM errors are thus effectively constant during each sphere measurement. Therefore, errors in the measured sphere radius at the different positions compared to a known (calibrated) sphere radius can be used to determine encoder errors in the scanning head, without being affected by any errors in the CMM. Thus, by using the radius measurement data, a non perfect CMM can be used to calibrate the scanning head without affecting the calibration accuracy. For example, the dimensional data determined from the measurements can be compared with the calibrated dimensional data for each position of the scanning head and this difference used to calibrate the encoders, in the same way as with the previous embodiment.

If sphere centre position is measured at each of the different scanning head positions, such sphere centre data will however be affected by errors in the CMM. As the CMM describes a big circle about the sphere, its geometrical errors (especially the squareness errors) will affect the measured positions of sphere centre and hence the calibration accuracy of the measurement scales. It can thus be seen that it is preferable to use a calibrated CMM (to minimise CMM errors) if variations in reference artefact position (e.g. sphere centre position) are measured using the scanning head.

It should be noted that whilst FIG. 10 shows the scanning head in different positions in a horizontal plane to achieve different A1 angles, the scanning head may also be moved to different positions in a vertical plane to achieve different A2 angles. In this manner, the measurement scales associated with both the A1 and A2 axes can be calibrated.

Although the above example describe calibrating a scanning head having two axes of rotation, it should be noted that calibration of scanning head having a single rotary axis or more than two rotary axes may be performed using the above method. It should also be noted that the above methods may be used to calibrate only some of the rotary axes of a multiple axis scanning head. It is also possible to use different methods of the invention to calibrate different rotary axes of a scanning head; for example, a ring of spheres calibration artefact based method may be used to calibrate one rotary axis of a scanning head whilst a single calibration sphere based method may be used to calibrate another axis of the same scanning head.

The invention claimed is:

1. A method of calibrating a measurement scale in a scanning head using a reference artefact, the method comprising the steps of;
   (i) rotating a surface sensing device mounted on the scanning head about at least one axis of the scanning head to move the surface sensing device into a plurality of different angular orientations relative to the reference artefact, the scanning head comprising at least one scale that provides a measure of a rotational position of the scanning head about the at least one axis;
   (ii) measuring, with the surface sensing device, at least one property of the reference artefact at each of the different angular orientations of step (i); and
   (iii) creating an error map or function relating measurements of the at least one measurement scale to angular orientations of the scanning head using the properties of the reference artefact measured in step (ii).

2. A method according to claim 1 wherein the reference artefact comprises a calibration artefact having at least one calibrated property, wherein step (iii) comprises creating the error map or function from the difference between the properties of the reference artefact measured in step (ii) and the at least one calibrated property of the reference artefact.

3. A method according to claim 1, wherein step (ii) comprises using the scanning head to rotate the surface sensing device about at least one axis of the scanning head during each measurement of a property of the reference artefact.

4. A method according to claim 3, wherein the scanning head comprises a base portion attachable to the moveable arm of a co-ordinate positioning apparatus, wherein step (ii) comprises providing only minimal motion of the base portion of the scanning head during each of the measurements of a property of the reference artefact.

5. A method according to claim 4, wherein step (ii) comprises keeping the base portion of the scanning head stationary during each of the measurements of a property of the reference artefact.

6. A method according to claim 1, wherein step (ii) comprises measuring at least one calibrated dimension of the reference artefact.

7. A method according to claim 1, wherein step (ii) comprises measuring the position of at least one feature of the reference artefact.

8. A method according to claim 1, wherein the reference artefact comprises an array of features, the relative positions of the features being calibrated.

9. A method according to claim 8 in which the scanning head comprises a base portion attachable to the moveable arm of a co-ordinate positioning apparatus, wherein the base portion of the scanning head is held substantially stationary during step (i).

10. A method according to claim 1, wherein the reference artefact comprises a single feature.

11. A method according to claim 10 in which the scanning head is attached to the moveable arm of a co-ordinate positioning apparatus, wherein step (i) also comprises the step of moving the scanning head relative to the reference artefact when the surface sensing device is moved into each of the plurality of different angular orientations.

12. A method according to claim 1, wherein the reference artefact comprises at least one of a sphere, a ring gauge, a bore, a boss or a cube.

13. A method according to claim 1, wherein the surface sensing device mounted to the scanning head comprises a scanning probe and step (ii) comprises measuring the property of the reference artefact at each of the different angular orientations by scanning along a path on the surface of the reference artefact.

14. A method according to claim 13 wherein the reference artefact comprises at least one sphere and step (ii) comprises, for each of the different angular orientations, the step of scanning along a circular path on the surface of a sphere to establish the radius and/or centre position of that sphere.

15. A method according to claim 1, wherein the surface sensing device mounted to the scanning head comprises a touch trigger probe and step (ii) comprises measuring a plurality of discrete points on the surface of the reference artefact at each of the different angular orientations.

16. A scanning head system for co-ordinate positioning apparatus, wherein the scanning head system stores an error map or function calculated using a method according to claim 1.

17. A method of calibrating a scanning head using a calibration artefact comprising a plurality of calibrated features, the method comprising the steps of
  (i) rotating a surface sensing device mounted on the scanning head about at least one axis of the scanning head to move the surface sensing device into a surface sensing relationship with a selected calibrated feature of the plurality of calibrated features, the scanning head comprising at least one scale that provides a measure of a rotational position of the scanning head about the at least one axis;
  (ii) measuring, with the surface sensing device, at least one property of the selected calibrated feature of the calibration artefact;
  (iii) repeating steps (i) and (ii) with at least one further selected calibrated feature; and
  (iv) creating an error map or function relating measurements from the for at least one measurement scale to angular orientations of the scanning head from the difference between the properties of the calibration artefact measured in step (ii) and the calibrated properties of the calibration artefact.

18. A method according to claim 17 wherein motion of the surface sensing device during step (i) is provided solely by rotation of the scanning head about the at least one axis of the scanning head.

19. A method of calibrating a scanning head using a reference artefact comprising a first feature, the method comprising the steps of;
  (i) placing a surface sensing device mounted on the scanning head in a first angular orientation relative to the first feature,
  (ii) measuring, with the surface sensing device, a property of the first feature of the reference artefact;
  (iii) using the scanning head to rotate the surface sensing device about at least one axis of the scanning head such that the surface sensing device adopts a different angular orientation relative to the first feature of the reference artefact, the scanning head comprising at least one scale that provides a measure of a rotational position of the scanning head about the at least one axis;
  (iv) remeasuring, with the surface sensing device, the property of the first feature of the reference artefact; and
  (v) creating an error map or function relating measurements from the at least one measurement scale to angular orientations of the scanning head from the measured properties of the first feature of the reference artefact that are acquired during steps (ii) and (iv).

20. A method according to claim 19, wherein the scanning head is mounted to the moveable arm of co-ordinate positioning apparatus and step (iii) also comprises the step of using the moveable arm to move the scanning head.

21. A method for calibrating a scanning head, comprising the steps of;
  (i) using a surface sensing device mounted on the scanning head to measure a property of a reference artefact;
  (ii) repeating the measurement of step (i) with one or more rotational axes of the scanning head rotated through a different angular range, the scanning head comprising one or more measurement scales that provides a measure of a rotational position of the scanning head about the one or more rotational axes; and
  (iii) creating an error map or function relating measurements from the one or more measurement scales to angular orientations of the scanning head from the measured properties of the reference artefact acquired in step (i).

22. A method of calibrating a measurement scale in a scanning head using a calibrated artefact, the method comprising the steps of;
  (i) rotating a surface sensing device mounted on the scanning head about at least one axis of the scanning head to move the surface sensing device into a plurality of different angular orientations relative to the calibrated artefact, the scanning head comprising at least one scale that provides a measure of a rotational position of the scanning head about the at least one axis;
  (ii) measuring, with the surface sensing device, a plurality of points on the calibrated artefact at each of the different angular orientations of step (i);
  (iii) rotating the calibrated artefact to different positions and repeating steps (i) and (ii); and
  (iv) creating an error map or function relating measurements from the at least one measurement scale of the scanning head (16) to an angular orientation of the scanning head from the plurality of points measured in step (ii) for each position of the calibrated artefact.

23. A method of calibrating a measurement scale in a scanning head using a calibrated artefact, the method comprising the steps of;
  (i) rotating a surface sensing device mounted on the scanning head about at least one axis of the scanning head to move the surface sensing device into a plurality of different angular orientations relative to the calibrated artefact, the scanning head comprising at least one scale that provides a measure of an angular orientation of the scanning head about the at least one axis;

(ii) measuring, with the surface sensing device, a plurality of points on the calibrated artefact at each of the different angular orientations of step (i); and
(iii) creating an error map or function correcting the measure of angular orientation measured from the at least one measurement scale from a comparison of the plurality of points measured in step (ii) and at least one calibrated dimension of the calibrated artefact.

24. A method of calibrating a measurement scale in a scanning head using a calibrated artefact, the method comprising the steps of;
(i) rotating a surface sensing device mounted on the scanning head about at least one axis of the scanning head to move the surface sensing device into a plurality of different angular orientations relative to the calibrated artefact, the scanning head comprising at least one scale that provides a measure of an angular orientation of the scanning head about the at least one axis;
(ii) measuring, with the surface sensing device, a plurality of points on the calibrated artefact at each of the different angular orientations of step (i);
(iii) rotating the calibrated artefact to different positions and repeating steps (i) and (ii); and
(iv) creating an error map or function correcting the measure of angular orientation measured from the at least one measurement scale from the plurality of points measured in step (ii) for each position of the calibrated artefact.

* * * * *